Patented Aug. 24, 1937

2,091,241

UNITED STATES PATENT OFFICE 2,091,241

PROCESS FOR THE PREPARATION OF DICARBOXYLIC ACID ESTERS

Hamline M. Kvalnes, Wilmington, Del., assignor to E. I. du Pont de Nemours & Company, Wilmington, Del., a corporation of Delaware No Drawing. Application December 22, 1934, Serial No. 758,751

7 Claims. (Cl. 260—103)

This invention relates to a process for the preparation of dicarboxylic acid esters and more particularly to the preparation of esters of phthalic acid.

An object of the present invention is to provide a new and improved process for the preparation of neutral esters of polycarboxylic acids. Another object of the invention is to provide a process for the preparation of esters by the interaction of a polycarboxylic acid or anhydride with an alcohol. A further object of the invention is to provide an improved method of effecting esterification between a polycarboxylic acid or anhydride with an alcohol. A further object of the invention is to provide an improved method of effecting esterification between a polycarboxylic acid or anhydride and an alcohol wherein the alcohol is added slowly to a boiling solution of anhydride or acid in an inert solvent. A still further object of the invention is to provide an improved method of effecting esterification between phthalic anhydride and alcohols wherein the alcohol is added slowly to a boiling solution of phthalic anhydride in an inert solvent. Yet another object of the invention is to provide conditions under which the reaction may be effected at a practical rate in such a manner that an exceptionally pure product in excellent yield is obtained. Other objects and advantages of the invention will hereinafter appear.

The objects of the invention may be realized by effecting the reaction between the anhydride and the alcohol at comparatively elevated temperatures subsequent, preferably, to solution of the anhydride in an inert solvent. When the esterification is conducted in this manner it has been found that the process is applicable to the preparation of the esters of a number of polycarboxylic acids and, furthermore, that a number of alcohols will react with the anhydride to form the ester. In fact, the process is generally applicable to esterifying reactions involving polycarboxylic acid anhydrides and alcohols.

The process consists generally of dissolving the anhydride in a suitable inert organic solvent which is not attacked by the anhydride or the alcohol which is to be added. The anhydride-inert solvent mixture is heated to its boiling point and the alcohol gradually added to the boiling mixture. The inert solvent is then removed by distillation, for example. The temperature of the resulting solution, now containing the anhydride, the alcohol, and such products as form at relatively low temperatures, is raised to 150° C. or higher and maintained at such a temperature until the esterification is complete. In many instances, it has been found that in order to maintain a temperature of above 150° C. pressures above atmospheric must be employed if low boiling anhydrides and/or alcohols are being esterified. Temperatures realized by such increased pressures tend to increase the velocity of the reaction and generally to increase the yield.

The process may also be carried out without use of inert solvent, by reacting at low temperatures the acid or anhydride with the alcohol to form an acid ester, then completing the reaction by raising the pressure (hence the temperature) sufficiently to cause formation of neutral esters of good quality in high yield and at a practical rate. One of the principal uses of the esters of phthalic acid is as plasticizers in thermoplastic resins and for such uses they should be free from impurities which in any way impart discoloration to the finished product. The production of such high boiling esters is usually carried out by reacting an acid or acid anhydride with an alcohol in the presence of a dehydrating catalyst. This dehydrating catalyst (used in order to make the reaction proceed at a practical rate) reacts, however, not only to remove water from alcohol and acid to give ester, but also from alcohol alone, for example to form unsaturated products, as olefines, etc. These by-products not only lower the yield of desired ester product, but give color, volatile material or highly non-volatile polymers or resins which are costly to remove, if not completely irremovable, by practical means.

My method avoids such dehydration to byproducts thru eliminating catalyst, and in case strong dehydrating anhydrides are used by rendering them innocuous thru presolution in an inert solvent avoids formation of such byproducts. This increases yield, removes or eliminates decomposition of the ester, and greatly improves quality. It also enables practical formation of esters from materials as branched chained alcohols which dehydrate to side products so readily if the normal procedure of making esters were followed or which give no ester whatsoever.

The process provides means of avoiding this side dehydration while causing esterification at a practical rate; mainly this consists in optional free solution of the acidic constituent in an inert solvent and the employment of much higher temperatures than are used normally for esterification. These temperatures are realized for most materials only by employing pressure in the reaction system.

It has been found that for best results the alcohol is added to the boiling solution of the anhydride in the inert solvent rather than effecting the addition in the reverse order, altho when the ester is to be used for purposes not requiring a high degree of purity, the alternative method, i. e. adding the anhydride to the alcohol, may be used if desired. A large number of inert solvents may be employed in the process, such, for example, as the hydrocarbons including benzene, toluene, xylol, or other organic solvents, such as 1,4 dioxan, solvent naphtha, and the like.

As has been indicated the reaction temperature should be maintained above 150° C. and preferably above 190° C., altho temperatures up to 250° C. or higher may be employed if desired, the temperature being determined by the type of anhydride and alcohol being esterified. Generally speaking, at the higher temperatures higher pressures will likewise be required in order to maintain these temperatures and this is particularly true when the low boiling alcohols and/or anhydrides are employed.

The process of this invention may be employed for the preparation of esters of a large number of polybasic acids such, for example, as carbonic, oxalic, malonic, succinic, phthalic, glutaric, adipic, pimelic, suberic, hexahydrophthalic, sebacic, tricarballylic, aconitic, phosphoric, tartaric, etc. The alcohols which may be reacted with the anhydride of the above and equivalent polybasic acids include the aliphatic alcohols such, for example, as methyl, ethyl, propyl, butyl alcohols and up to and including the higher alcohols such as the nonyl, decyl, heptyl, myristyl alcohols, etc., as well as the individual or mixture of alcohols obtained in the catalytic hydrogenation of carbon oxides under elevated temperatures and pressures which include such alcohols as 2-methyl butanol-1, 3-methyl butanol-2, 2,4-dimethyl pentanol-3, 2,4-dimethyl hexanol-3, 4-methyl hexanol-1, and 4-methyl heptanol-1. The aromatic alcohols, such as benzyl alcohol, tolyl alcohol, are also applicable. Other primary, secondary, or tertiary branch or straight chain cyclic or heterocyclic alcohols, such as isopropyl, tertiary butyl, cyclohexyl, furfuryl alcohol, etc., may likewise be reacted with the dicarboxylic acid anhydride to form the corresponding ester.

I shall now give examples indicating preferred methods of conducting the process, but it will be understood that I shall not be restricted by the details or proportions of the constituents therein given, except as they may be limited by the claims appended hereto.

*Example 1.*—296 parts of phthalic anhydride and 215 parts of toluene (parts are all by weight) are added directly to a still pot suitable for esterification. The resulting mixture is heated with stirring to effect solution between the toluene and the phthalic anhydride, the temperature of the solution is then raised to its boiling point, which is approximately 130° C., and while the solution is at this temperature a mixture of alcohols boiling between 133° C. and 180° C. and obtained from the catalytic hydrogenation of carbon oxides under elevated temperatures and pressures is gradually added (this mixture of alcohols may be obtained in accord with the process described in the Williams Patent No. 1,820,417, or by similar processes), care being exercised that the rate of addition does not cause the temperature of the solution to drop so low that solid phthalic anhydride or solid monoester will form. Vigorour stirring is preferably employed in order that the alcohol may be added with considerable rapidity. Approximately 935 parts of this alcohol mixture are added giving thereby an excess of the alcohol over the theoretical amount required to esterify the anhydride. After the addition of the alcohol the toluene is distilled off until substantially all has been removed. Pressure is applied over the mixture and the temperature is thereby increased to approximately 190° C. As the esterification proceeds, the temperature of the mixture increases; at the end of 20 hours the reaction mixture is at approximately 210° C. (a pressure of approximately 2 atmospheres absolute is required to obtain this temperature). The crude phthalic acid esters are refined by steam distillation and a product obtained which gives a yield of 91.4%.

The following examples were conducted utilizing the procedural steps of Example 1 with the given amounts of ingredients, degree of conditions, and percentage yields:

| Example | Parts phthalic anhydride | Parts toluene | Alcohols | Parts alcs. | Esterification temperature | | Absolute pressure | Yield |
|---|---|---|---|---|---|---|---|---|
| | | | | | Initial | Final | | |
| | | | | | °C. | °C. | Atmosphere | Percent |
| 2 | 296 | 215 | Alcohol mixt. B. P. 150–160° C | 984 | 192 | 210 | 1.5 | 93.4 |
| 3 | 296 | 0 | n-Butanol (117° C.) | 370 | 160 | 206 | 2 | 97.4 |
| 4 | 296 | 215 | Cyclohexanol (160° C.) | 800 | 201 | 210 | 2 | 91.7 |
| 5 | 296 | 0 | Isobutanol (108° C.) | 370 | 150 | 190 | 2 | 95.4 |

From a consideration of the above specification, it will be appreciated that many improvements and changes may be made in the manner of effecting the above process without departing from the scope of the invention or sacrificing any of its advantages.

I claim:

1. In a process for the preparation of an ester of a dicarboxylic acid the steps which comprise dissolving a compound selected from the group consisting of a dicarboxylic acid and a dicarboxylic acid anhydride in an inert solvent, heating the resulting mixture to its boiling point and while maintaining it at approximately this temperature gradually adding an alcohol thereto, removing from the resulting solution the inert solvent, and subsequently carrying out the esterification at a temperature above 150° C.

2. In a process for the preparation of an ester of a dicarboxylic acid the steps which comprise dissolving a dicarboxylic acid hydride in an inert solvent, heating the dicarboxylic acid anhydride inert solution mixture to its boiling point and while maintaining it at approximately this temperature gradually adding an alcohol thereto, removing from the resulting solution the inert solvent, and subsequently carrying out the esterification at a temperature above 150° C.

3. In a process for the preparation of an ester of a dicarboxylic acid the steps which comprise dissolving a dicarboxylic acid anhydride in an inert solvent therefor, heating the resulting solution to its boiling point and while maintaining it at this temperature gradually adding an aliphatic alcohol thereto, removing the inert solvent, and subsequently effecting the esterification by conducting the reaction at temperatures above 150° C. and at pressures above atmospheric pressure.

4. In a process for the preparation of an ester of phthalic acid the steps which comprise dissolving phthalic acid anhydride in an inert solvent therefor, heating the resulting solution to boiling, while maintaining it at approximately this temperature, gradually adding an alcohol thereto, and subsequently heating the resulting solution to a temperature ranging between 150 and 250° C.

5. In a process for the preparation of a mixture of esters of phthalic acid the steps which comprise dissolving phthalic anhydride in toluene, heating the resulting solution to its boiling point, and while maintaining it at approximately this temperature gradually adding a mixture of alcohols thereto obtained from the catalytic hydrogenation of carbon oxides under elevated temperatures and pressures, distilling off the toluene, and subsequently effecting the esterification at a temperature between 150–250° C. and at a pressure in excess of 1 atmosphere.

6. In a process for the preparation of normal butyl phthalate the steps which comprise dissolving phthalic acid anhydride in toluene, heating the phthalic acid anhydride-toluene solution to its boiling point and while maintaining it at that temperature gradually adding normal butanol thereto, removing the toluene from the resulting solution and subsequently effecting the esterification at a temperature in excess of 150° C.

7. In a process for the preparation of cyclohexyl phthalate the steps which comprise dissolving phthalic acid anhydride in toluene, heating the phthalic acid anhydride-toluene solution to its boiling point, and while maintaining it at that temperature gradually adding cyclohexanol thereto, removing the toluene from the resulting solution and subsequently effecting the esterification at a temperature in excess of 150° C.

HAMLINE M. KVALNES.